No. 826,756. PATENTED JULY 24, 1906.
E. WALDRON.
COUPLING.
APPLICATION FILED JUNE 24, 1905.

WITNESSES:

INVENTOR
Edward Waldron
BY
Chas. N. Butler
ATTORNEY.

UNITED STATES PATENT OFFICE.

EDWARD WALDRON, OF PHILADELPHIA, PENNSYLVANIA, ASSIGNOR TO WALDRON FLEXIBLE ROTARY ENGINE COMPANY, OF CAMDEN, NEW JERSEY, A CORPORATION OF NEW JERSEY.

COUPLING.

No. 826,756.

Specification of Letters Patent.

Patented July 24, 1906.

Application filed June 24, 1905. Serial No. 266,715.

*To all whom it may concern:*

Be it known that I, EDWARD WALDRON, residing at Philadelphia, in the county of Philadelphia and State of Pennsylvania, have invented certain Improvements in Couplings, of which the following is a specification.

This invention is a flexible coupling suitable for connecting shafts used in transmitting power, so that they may revolve together when out of alinement; and its leading purpose is to provide in such mechanism flexibility combined with simplicity, strength, durability, and self-lubrication.

Figure 1:
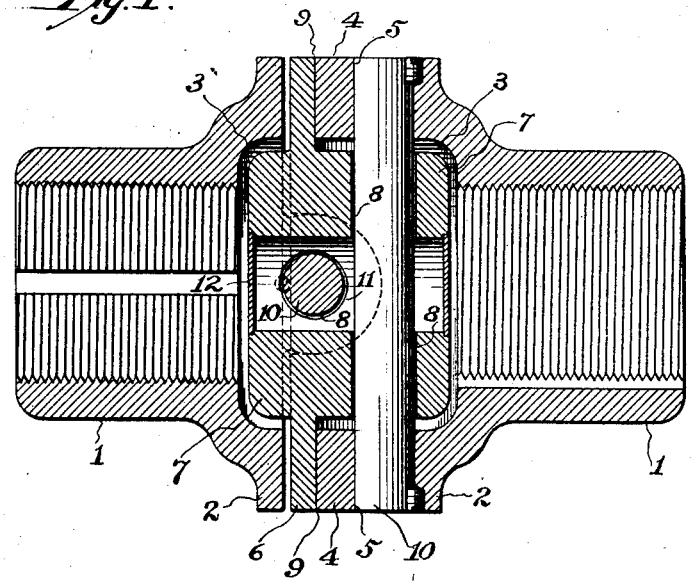
Figure 3:
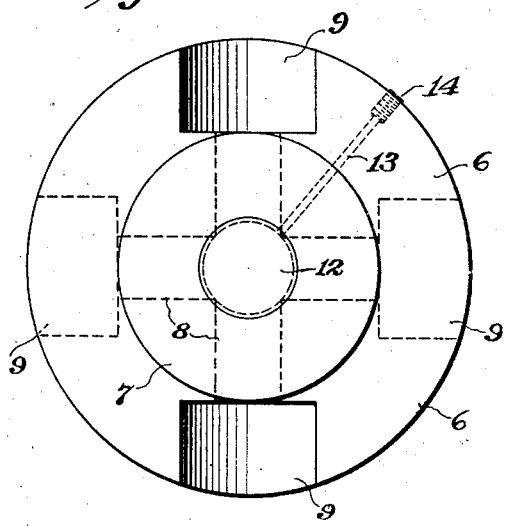
Figure 2:
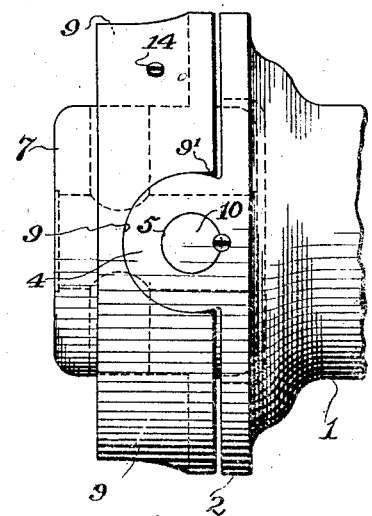

In the accompanying drawings, Figure 1 represents a longitudinal sectional view of a coupling made in accordance with the invention. Fig. 2 represents a side elevation of parts thereof, and Fig. 3 represents a plan view of the center piece.

The mechanism comprises a pair of similar end pieces each having an internally-threaded sleeve 1, with a circular flange or disk 2 thereon, with curved central sockets 3 therein, and thereon cylindrical lugs 4, with holes 5 therethrough. The end pieces have disposed between them a center piece comprising a body portion in the form of a ring 6, with curved hubs 7 projecting from the faces thereof and having the holes 8 therethrough and with cylindrical bearings 9 formed in the opposite faces of the ring, the sockets 3 receiving the hubs 7, which have free play therein.

The holes 8 and bearings 9 of each face of the center piece have a common axis disposed at right angles to that of the other. The lugs 4 of each end piece fit and revolve in bearings 9 of a face of the center-piece ring, and pins 10 are set in the holes 5 and pass freely through the holes 8 to engage the end pieces to the center-piece. Thus each sleeve is provided with an oscillating and laterally-movable connection to the center piece at right angles to that of the other, sufficient space being provided between the disks 2 and ring 6 and between the sockets 3 and hubs 7 to secure such freedom of movement, and hence shafts connected to the respective sleeves may rotate together and be driven one from the other with their lines disposed at an angle to each other or in parallel relation.

The center-piece has therein a chamber 11, with its ends closed by disks 12, the chamber being filled with oil through a duct 13, which is normally closed by a screw-plug 14. This chamber is filled with a lubricant which works along the pins 10, passing through the chamber, through the holes 8, and into the bearings 9, thus lubricating all the movable parts.

The construction will be seen to be such that power is transmitted through the coupling from one shaft to the other without wearing or straining the pins, the lugs of the end pieces, and the bearings of the center piece taking the torque. The cylindrical bearings 9 are full semicylinders terminating in tangent planes 9', and the surfaces of the lugs 4 are extended beyond one hundred and eighty degrees to permit the parts to be joined together, so that a fair engagement takes place between them in transmitting motion of rotation while permitting freedom of oscillation. As the transversely-disposed pins 10 move freely in the holes 8 and as the hubs 7 have free play in the sockets 3, it will be understood that the respective end pieces 1 are connected to the intermediate member 6, so that the end members oscillate upon axes extending transversely to each other and reciprocate in planes transverse to their respective planes of oscillation.

Having described my invention, I claim—

1. A coupling comprising a pair of similar end pieces each having a socket therein and curved lugs thereon, an intermediate piece having hubs respectively disposed in said sockets and angularly-disposed curved bearings in which said lugs are engaged, and pins respectively passing through a hub of said intermediate piece and lugs of one of said end pieces.

2. A coupling comprising end members and an intermediate member, said intermediate member having oppositely-disposed curved bearings with axes extending transversely to each other and said end members having curved bearings engaging with the corresponding bearings of the intermediate member, and angularly-disposed pins passing through and engaging said end and intermediate members.

3. A coupling comprising an intermediate member having curved bearings on each of two parallel sides thereof, the axes of said bearings lying in parallel planes and extending transversely to each other, end members having curved bearings adapted to engage and oscillate in relation to the bearings of said intermediate member, and pins in the axes of oscillation of said bearings engaging said end and intermediate members together.

4. A coupling comprising end pieces having recesses therein and lugs with curved bearings thereon, a center piece having projections disposed in said recesses and concave bearings angularly disposed for engaging said lugs, and pins passing through said lugs and projections for securing said members together.

5. A coupling comprising a center piece comprising a ring having curved bearings, an oil-chamber in said bearing-piece, end pieces having curved bearings engaging the bearings of said center piece, and pins connecting said center piece to said end pieces and extending through said oil-chamber, said oil-chamber communicating with the bearings of said parts.

6. A coupling comprising a pair of sleeves having flanges with curved lugs thereon and recesses therein, a center piece having a ring with concave bearings therein and projections thereon, and pins passing through said lugs and projections.

7. A coupling comprising end members each having a recess and curved bearings, an intermediate member having projections adapted to oscillate and move laterally in said recesses and curved bearings with transverse axes which fit the bearings of said end members, and transversely-extending pins respectively passing through the bearings of an end member and a projection of the intermediate member, said end members oscillating on and reciprocating in the direction of the axes of said pins.

In testimony whereof I have hereunto set my hand, this 23d day of June, 1905, in the presence of the subscribing witnesses.

EDWARD WALDRON.

Witnesses:
  MAURICE A. ROGERS,
  ROBERT JAMES EARLEY.